(12) United States Patent
Kuzuyama

(10) Patent No.: US 7,066,158 B2
(45) Date of Patent: Jun. 27, 2006

(54) HOMOGENEOUS CHARGE COMPRESSION IGNITION INTERNAL COMBUSTION ENGINE THAT PERFORMS EGR, AND IGNITION TIMING CONTROL METHOD FOR THE ENGINE

(75) Inventor: Hiroshi Kuzuyama, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/946,855

(22) Filed: Sep. 22, 2004

(65) Prior Publication Data

US 2005/0061303 A1 Mar. 24, 2005

(30) Foreign Application Priority Data

Sep. 22, 2003 (JP) .............................. 2003-329267

(51) Int. Cl.
F02D 13/02 (2006.01)
F02B 37/04 (2006.01)
F02B 1/12 (2006.01)
F02B 11/08 (2006.01)
F02M 25/07 (2006.01)

(52) U.S. Cl. ............... 123/561; 60/605.2; 123/565; 123/568.14

(58) Field of Classification Search ........... 123/565, 123/568.14, 561; 60/605.2
See application file for complete search history.

(56) References Cited

U.S. PATENT DOCUMENTS

| 4,075,990 | A * | 2/1978 | Ribeton ............... 123/568.14 |
| 4,958,606 | A * | 9/1990 | Hitomi et al. ........... 123/559.1 |
| 6,234,123 | B1 | 5/2001 | Iiyama et al. .......... 123/90.15 |
| 6,619,242 | B1 * | 9/2003 | Kaneko ................ 123/90.15 |
| 6,626,164 | B1 * | 9/2003 | Hitomi et al. ......... 123/568.14 |
| 6,755,022 | B1 * | 6/2004 | Kim et al. ................ 60/608 |
| 6,817,349 | B1 * | 11/2004 | Awasaka et al. ........... 123/565 |
| 6,925,976 | B1 * | 8/2005 | Israel et al. ............ 123/90.12 |
| 2002/0166536 | A1 * | 11/2002 | Hitomi et al. .......... 123/90.15 |
| 2003/0178002 | A1 * | 9/2003 | Israel et al. ............. 60/605.2 |
| 2003/0196646 | A1 | 10/2003 | Shoyama et al. ...... 123/568.14 |

FOREIGN PATENT DOCUMENTS

| JP | 2003-64863 | 2/2000 |
| JP | 2001-107810 | 4/2001 |
| JP | 2001-355462 | 12/2001 |

* cited by examiner

Primary Examiner—Sheldon J Richter
(74) Attorney, Agent, or Firm—Morgan & Finnegan, LLP

(57) ABSTRACT

A combustion chamber of a homogeneous charge compression ignition internal combustion engine that performs EGR communicates with an intake passage and an exhaust passage. The combustion chamber is opened and closed to the intake passage with an intake valve, and is opened and closed to the exhaust passage with an exhaust valve. The closing timing of the exhaust valve in the exhaust stroke is advanced relative to the top dead center of the piston. A supercharger of a variable supercharging pressure type is located in the intake passage. This configuration expands the operational range of the engine to a higher load region.

18 Claims, 5 Drawing Sheets

HOMOGENEOUS CHARGE COMPRESSION IGNITION INTERNAL COMBUSTION ENGINE THAT PERFORMS EGR, AND IGNITION TIMING CONTROL METHOD FOR THE ENGINE

BACKGROUND OF THE INVENTION

The present invention relates to a homogeneous charge compression ignition internal combustion engine (HCCI internal combustion engine) that performs EGR for recirculating exhaust gas to a combustion chamber. Also, the present invention pertains to a method for controlling ignition timing of premixture in an HCCI internal combustion engine.

For example, Japanese Laid-Open Patent Publication No. 2000-64863 discloses an HCCI internal combustion engine that performs EGR. In this publication, when compression ignition is performed with a low load, closing timing of the exhaust valve is advanced to a point in exhaust stroke immediately before the piston reaches the top dead center. That is, the closing timing of the exhaust valve is advanced to a point before the piston reaches the top dead center in the exhaust stroke. Accordingly, high temperature combusted gas stays in the combustion chamber as internal EGR gas. The internal EGR gas is mixed with new air drawn into the combustion chamber in the subsequent cycle. This improves the ignitability of compression ignition. Also, the apparatus of the publication performs compression ignition when the load is low and performs spark ignition combustion.

Typically, in an HCCI internal combustion engine, fuel and air is premixed and the mixture is compressed to self-ignite. Control factors including the temperature, the pressure, and the fuel concentration must be appropriately controlled such that self-ignition occurs when the piston is at the top dead center or in the vicinity thereof. The control of these factors is extremely difficult. Accordingly, such an engine is operated in a region where the control of the factors is not difficult. As a result, the operational region is narrow.

The operational range of the HCCI internal combustion engine of the above publication is desired to be widened so that compression ignition can be executed in a range where spark ignition is currently executed. This will maximize the advantages of compression ignition, or a high thermal efficiency and less emission of toxic substances.

SUMMARY OF THE INVENTION

Accordingly, it is an objective of the present invention to provide an HCCI internal combustion engine that performs EGR and expands the operational range to the higher load side, and a method for controlling the ignition timing.

To achieve the foregoing and other objectives and in accordance with the purpose of the present invention, a homogeneous charge compression ignition internal combustion engine that performs EGR is provided. The engine includes a piston, a combustion chamber, intake and exhaust passages that communicate with the combustion chamber, an intake valve that opens and closes the combustion chamber to the intake passage; and, an exhaust valve that opens and closes the combustion chamber to the exhaust passage. The closing timing of the exhaust valve is advanced to a point prior to the point at which the piston reaches the top dead center in the exhaust stroke. A supercharger is located in the intake passage. The supercharger is of a variable supercharging pressure type.

The present invention also provides a method for controlling ignition timing of a homogeneous charge compression ignition internal combustion engine that includes a piston, a combustion chamber, and intake and exhaust passages that communicate with the combustion chamber. The method includes: opening and closing the combustion chamber to the intake passage with an intake valve in the intake stroke of the piston; opening and closing the combustion chamber to the exhaust passage with an exhaust valve in the exhaust stroke of the piston, wherein the exhaust valve closes before the piston reaches the top dead center in the exhaust stroke; and changing supercharging pressure of a supercharger, which is of a variable supercharging pressure type and is located in the intake passage, according to a demanded load of the engine, thereby controlling the ignition timing of premixture in the combustion chamber.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment according to the present invention will now be described.

Figure 1:
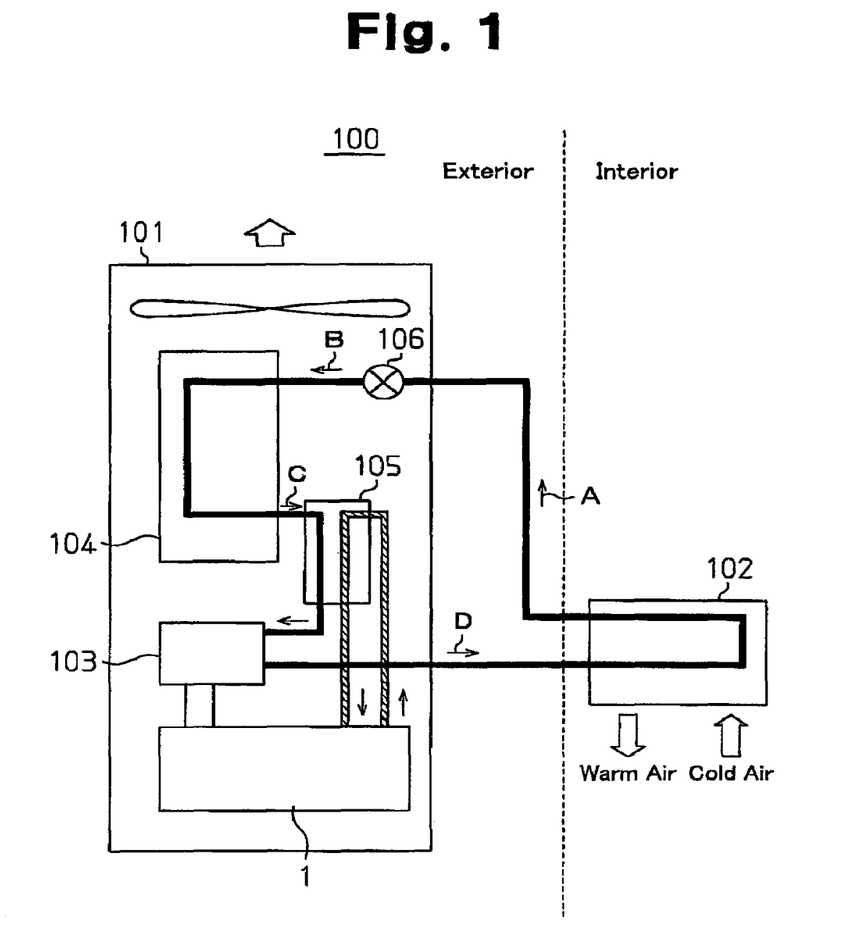
FIG. 1 is a diagrammatic view illustrating a gas heat pump equipped with an HCCI internal combustion engine.

FIG. 1 is shows a gas heat pump 100 having an internal combustion engine 1. The engine 1 is a four-stroke compression ignition type engine according to one embodiment of the present invention. For example, the engine 1 is used in the gas heat pump 100 shown in FIG. 1. In this case, the engine 1 is a gas engine that uses town gas (natural gas). The gas heat pump 100 drives heat pump cycle with the engine 1 for air conditioning and healing. FIG. 1 shows the system when functioning as a heating cycle.

The gas heat pump 100 includes an outdoor unit 101 and an indoor unit 102. The outdoor unit 101 includes the gas engine 1 according to this embodiment, a compressor 103 driven by the engine 1, heat exchangers 104, 105, and an expansion valve 106.

Refrigerant is condensed and liquefied at a heat exchanger (not shown) in the indoor unit 102 and discharges heat, thereby heating the interior. The refrigerant then flows along arrows A and passes the expansion valve 106. The refrigerant then becomes low temperature low pressure liquid. Thereafter, the refrigerant flows along arrow B and evaporates at the heat exchanger 104 in the outdoor unit 101, and absorbs heat. The refrigerant then becomes low temperature low pressure gas. Subsequently, the refrigerant flows along arrow C and is compressed by the compressor. The refrigerant becomes high temperature high pressure gas, accordingly. The, the refrigerant flows along arrow D and is liquefied at the indoor unit 102 to discharge heat. The heating cycle is repeated in the gas heat pump 100. FIG. 1 exemplifies a cycle in which exhaust heat of the engine 1 is used to circulate hot water, and a heat exchange cycle is carried out between the refrigerant and the heat exchanger 105.

Figure 2:
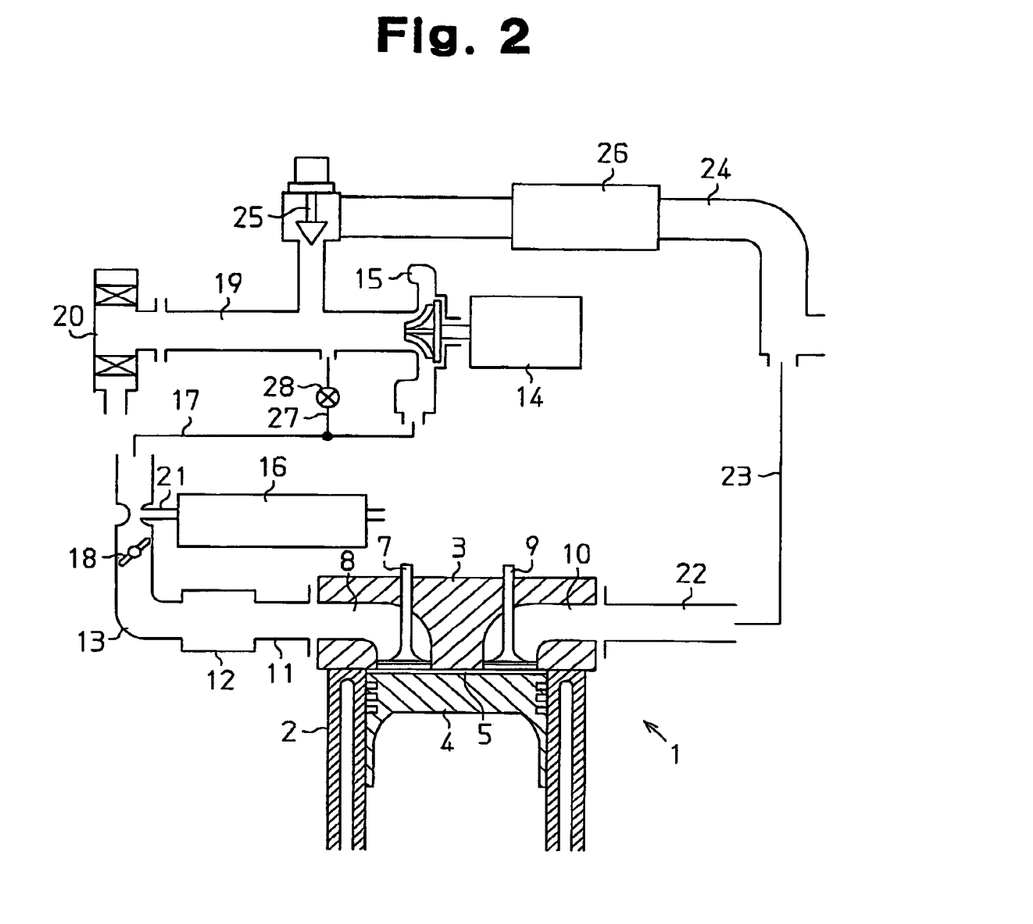
FIG. 2 is a diagrammatic view showing the configuration of the engine in the heat pull shown in FIG. 1.

As shown in FIG. 2, the engine 1 includes a cylinder block 2, a cylinder head 3, a piston 4, an intake valve 7, and an exhaust valve 9. A combustion chamber b is defined in the cylinder block 2. An intake port 8 and an exhaust port 10 communicate with the combustion chamber 5.

The intake port 8 is connected to a surge tank 12 through an intake manifold 11. The surge tank 12 is connected to an intake duct 13. The intake duct 13 is connected to an outlet of a supercharger 15 through an intake line 17. The supercharger 15 is a centrifugal compressor driven by an electric motor 14. A fuel supply port 21 of a gas regulator 16 is connected to a section of the intake duct 13. The gas regulator 16 supplies fuel to the intake duct 13. A throttle valve 18 is located in the intake duct 13. An inlet of the supercharger 15 is connected to an air cleaner 20 through an air intake pipe 19.

A bypass passage 27 is provided to connect the air intake pipe 19 and the intake line 17. A bypass control valve 28 is provided to open and close the bypass passage 27.

The exhaust port 10 is connected to an exhaust pipe 23 through an exhaust manifold 22. The exhaust pipe 23 is connected to a section of the air intake pipe 19 through an exhaust gas recirculation (EGR) passage 24. That is, an opening of the EGR passage 24 in the intake system is located at a section upstream of the supercharger 15.

An EGR control valve 25 is located in the EGR passage 24. Also, an EGR cooler 26 is located in the ECR passage 24. The EGR cooler 26 cools EGR gas flowing through the ECR passage 24.

The engine 1 includes an intake camshaft and an exhaust camshaft (not shown) corresponding to the intake valve 7 and the exhaust valve 9, respectively. Variable valve timing mechanisms 31, 32 are provided at the intake and exhaust camshafts, respectively, to independently vary the valve timing (valve opening timing and valve closing timing) of the intake and exhaust valves 7, 9. The variable valve timing mechanisms 31, 32 adjust the rotational phase of the camshafts relative to a crankshaft (not shown), thereby opening and closing the intake valve 7 and the exhaust valve 9. Accordingly, a period during which the intake and exhaust valves 7, 9 are both closed can be arbitrarily controlled. The variable valve timing mechanisms 31, 32 are connected to an intake hydraulic control valve 33 and an exhaust hydraulic control valve 34, respectively. Hydraulic pressure in the hydraulic control valves 33, 34 is controlled to permit the variable valve timing mechanisms 31, 32 to adjust the valve timing. The variable valve timing mechanisms 31, 32 are, for examples, the ones disclosed in Japanese Laid-Open Patent Publication No. 2001-355462.

Figure 3:
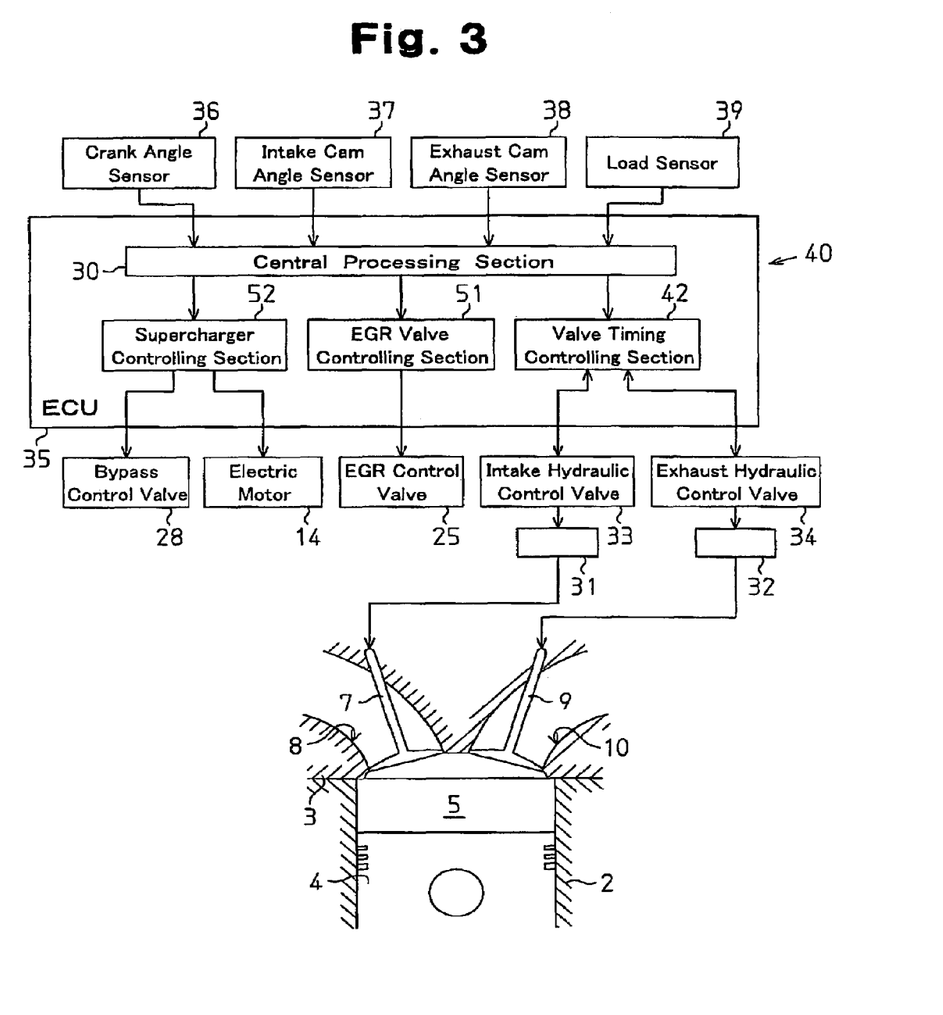
FIG. 3 is a block diagram showing a configuration for controlling the engine shown in FIG. 2.

Next, an engine controlling apparatus 40 for the engine 1 will now be described. As shown in FIG. 3, the engine controlling apparatus 40 includes the variable valve timing mechanisms 31, 32 for varying the valve timing of the intake and exhaust valves 7, 9, and an engine control unit (ECU) 35 that controls the hydraulic control valves 33, 34 and performs various control procedures of the engine 1.

The ECU 35 includes a central processing section 30, a valve timing controlling section 42 for controlling the variable valve timing mechanisms 31, 32, an EGR valve controlling section b1, and a supercharger controlling section 52. The central processing section 30, the valve timing controlling section 42, the EGR valve controlling section 51, and the supercharger controlling section 52 represent functions executed by the ECU 35 and do not represent hardware components. The ECU 35 is connected to a crank angle sensor 36, an intake cam angle sensor 37, an exhaust cam angle sensor 38, and a load sensor 39. The crank angle sensor 36 is provided at the crankshaft and outputs a crank angle signal at every predetermined crank angle. The intake cam angle sensor 37 and the exhaust cam angle sensor 38 are located at the intake camshaft and the exhaust camshaft, respectively, and each output a cam angle signal at every predetermined cam angle. The load sensor 39 outputs a set operational condition of the indoor unit 102 as a load signal. Alternatively, the load sensor detects the operational condition of the compressor 103 and outputs the detected condition as a load signal. The ECU 35 receives signals from these sensors. Also, the ECU 35 is connected to the hydraulic control valves 33, 34 and controls the valves 33, 34 as shown below.

The hardware components (not shown) of the ECU 35 include a CPU, a ROM, and a RAM. The ROM stores various programs used for controlling the operation of the engine 1. The RAM temporarily stores results of computations during execution of the programs. The CPU executes computations and processes based on various received signals and programs stored in the ROM, thereby controlling the hydraulic control valves 33, 34. By combining the hardware and software components, the ECU 35 functions as the central processing section 30, the valve timing controlling section 42, the EGR valve controlling section 51, and the supercharger controlling section 52.

According to the load signal from the load sensor 39, the valve timing controlling section 42 sets a period during which the intake valve 7 and the exhaust valve 9 are both closed, and sets the opening and closing timing of the intake valve 7 arid the exhaust valve 9. In this embodiment, the valve timing controlling section 42 sets the closing timing of the exhaust valve 9 at a point that is prior to the top dead center of the intake stroke of the piston 4. The valve timing controlling section 42 also delays the opening timing of the intake valve 7 to a point that is subsequent to the top dead center of the intake stroke of the piston 4. The amount by which the opening of the intake valve 7 is delayed relative to the top dead center of the intake stroke is the same as the amount by which the closing timing of the exhaust valve 9 is advanced relative to the top dead center of the intake stroke. In this manner, the target valve timing is set such that a period during which the intake and exhaust valves 7, 9 are both closed exists from the exhaust stroke to the intake stroke. Based on signals from the crank angle sensor 36, the cam angle sensors 37, 38, and the hydraulic control valves 33, 34, the actual valve timing of the intake and exhaust valves 7, 9 is obtained. Accordingly, commands to the hydraulic control valves 33, 34 are adjusted to execute feedback control of the variable valve timing mechanisms 31, 32 such that the valve timing of the intake and exhaust valves 7, 9 seeks the target valve timing.

The EGR valve controlling section 51 is connected to the ECR control valve 25 to change the opening degree of the EGR control valve 25. On the other hand, the supercharger controlling section 52 is electrically connected to the electric motor 14. The supercharger controlling section 52 changes the number of revolutions of the motor 14, thereby controlling the supercharging pressure. The supercharger controlling section 52 is also connected to the bypass control valve 28 to open and close the bypass control valve 28.

An operation of the ECU 35 will now be described.

Based on signals from the crank angle sensor 36 and the load sensor 39, the ECU 35 computes and obtains the current number of revolutions of the engine 1 and the required load at predetermined intervals. The ECU 35 compares the obtained number of revolutions and load with a control map stored in the ROM and determines whether to (a) perform the supply of internal EGR gas, (b) perform supercharging in addition to the supply of internal EGR gas, or (c) perform the supply of internal EGR gas, the supercharging, and supply of external EGR gas.

Figure 4:
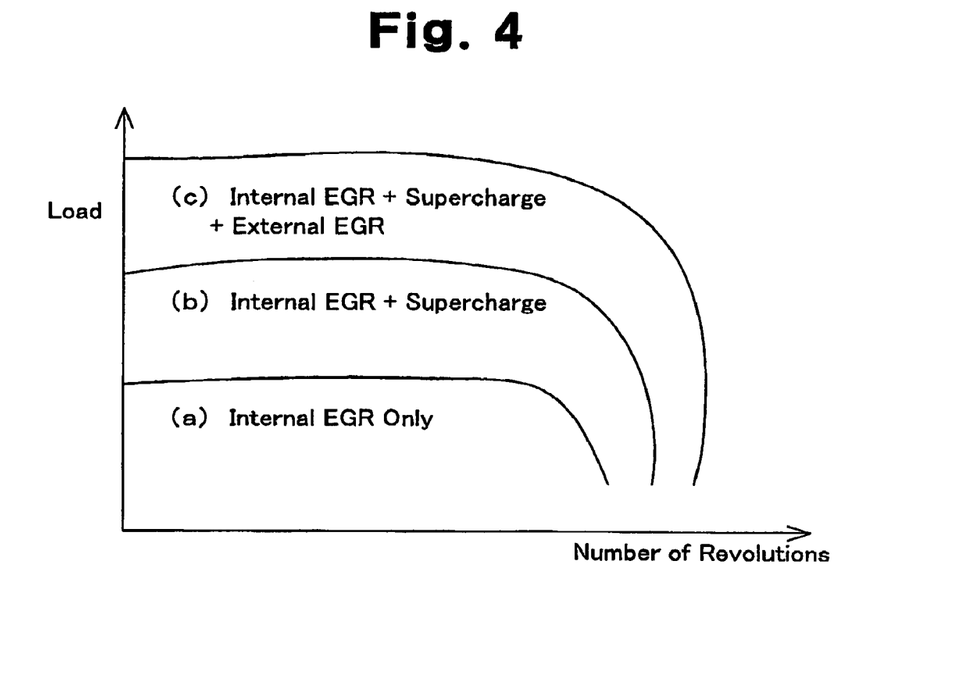
FIG. 4 is a diagram showing a map for controlling ignition.

The control map is, for example, a map shown in FIG. 4. The map is set such that (a) the supply of internal ECR gas is performed in a low number of revolutions and low load region, (b) the supply of internal EGR gas and the supercharging are performed in an intermediate load region, and (c) the supply of internal EGR gas, the supercharging, and the external EGR gas are performed in a high load region. The configuration other than the one in which the map is stored in the ROM and data is compared with the map may be applied. For example, a configuration may be applied in which the number of revolutions of the engine 1 and the load are substituted into a stored formula to determine which one of the procedures (a), (b), and (c) should be executed.

In the case of procedure (a), or when only the supply of EGR gas should be performed, the valve timing is controlled in accordance with a demanded load to adjust the EGR amount. Since no supercharging is executed in the region of the procedure (a), the electric motor 14 is stopped. The bypass control valve 28 is opened so that the bypass passage 27 is opened. Accordingly, new air is supplied to the combustion chamber 5 through the bypass passage 27. In the region of the procedure (a), the opening degree of the EGR control valve 25 is controlled to be zero. Therefore, exhaust gas (external EGR gas) is not supplied to the intake side through the EGR passage 24.

Figure 5:
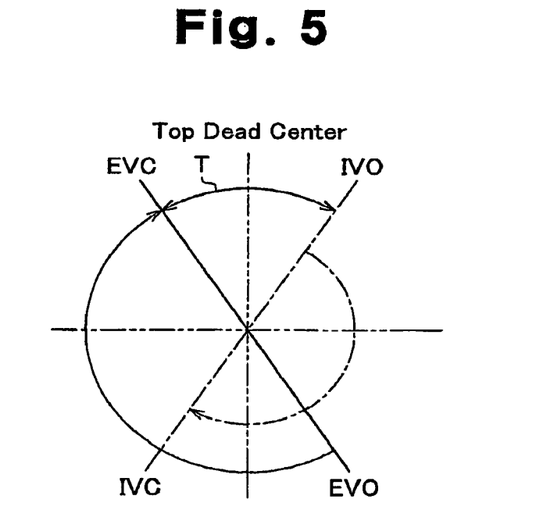
FIG. 5 is diagrammatic view showing opening and closing timing of intake and exhaust valves of the internal combustion engine of FIG. 2.

FIG. 5 diagrammatically shows the valve timing of the intake and exhaust valves 7, 9 when the engine 1 is operating with compression ignition. As shown in FIG. 5, from the exhaust stroke to the intake stroke, closing timing of the exhaust valve 9, or exhaust valve closing (EVC), is advanced relative to the top dead center of the intake stroke. Also, the opening timing of the intake valve 7, or intake valve opening (IVO), is controlled to be delayed relative to the top dead center of the intake stroke. In other words, the intake and exhaust valves 7, 9 are controlled such that a period during which both valves 7, 9 are closed (negative overlap period) T exists.

Advantages of the above described control will now be described. When the expansion stroke ends and the exhaust stroke starts, some of exhaust gas (combusted gas) is discharged through the exhaust port 10 as the piston 4 is moved upward. However, since the exhaust valve 9 is closed at a point (EVC) prior to the top dead center of the intake stroke of the piston 4, the combusted gas is trapped in the combustion chamber 5 after the exhaust valve 9 is closed. The combusted gas remains in the combustion chamber 5. The residual gas is referred to as internal EGR gas.

Then, the intake valve 7 is opened at a point (IVO) that is delayed relative to the top dead center of the intake stroke of the piston 4. This causes mixture of air and fuel supplied from the intake port 8 to be mixed with the residual gas in the combustion chamber 5. As a result, the internal EGR gas, which has been combusted and has a high temperature, heats the mixture, thereby improving the ignitability of the mixture.

In the operational region of the procedure (a), the valve timing is controlled, for example, in the following manner. As the load is decreased, the closing timing of the exhaust valve 9 is advanced and the opening timing of the intake valve 7 is delayed. To the contrary, as the load is increased, the closing timing of the exhaust valve 9 is delayed and the opening timing of the intake valve 7 is advanced.

Accordingly, the amount of high temperature internal EGR gas is increased when the load is low. This permits the compression ignition of a lean mixture to be sufficiently and stably performed. That is, the fuel economy in the low load operation is improved, and the emission of NOx is reduced. On the other hand, the amount of high temperature internal EGR gas is reduced as the load is increased. This prevents knocking from occurring.

In the intermediate load region, or during the procedure (b), the ECU 35 determines that the supercharging is necessary in addition to the supply of internal EGR gas. In this case, the ECU 35 drives the electric motor 14 to perform supercharging and closes the bypass control valve 28 to block the bypass passage 27. Since the supply of external EGR gas is riot performed in the operational region of the procedure (b), the opening degree of the EGR control valve 25 is controlled to be zero.

In the operation region of the procedure (b), the amount of air supplied to the cylinder is reduced by a degree that corresponds to the amount of internal. ECR gas. The short of intake air is compensated for by the supercharging by the electric motor 14. That is, the supercharger 15 is actuated to increase the intake pressure, thereby increasing the amount of air and fuel supplied to the combustion chamber 5 through the intake port 8. Accordingly, the ignitability is improved.

In the operation region of the procedure (b), the EGR is performed not by drawing exhaust gas, but by advancing the closing timing of the exhaust valve 9 relative to the top dead center of the piston 4, thereby causing some of exhaust gas to remain in the cylinder. Therefore, 3 sufficient amount of internal EGR gas is readily secured. The combination of the internal ECR gas and the supercharging reliably improves the ignitability.

In the operation region of the procedure (b), the speed of the electric motor 14 is increased, that is, the supercharging pressure is increased, as the demanded load is increased. The valve timing of the intake and exhaust valves 7, 9 may be fixed to trap an appropriate amount of internal EGR gas. Alternatively, the valve timing of the intake valve i and the exhaust valve 9 may be changed together with the change of the supercharging pressure. In this case, the supercharging pressure is changed according to the load. This expands the operational range of the engine 1 to a higher load region.

In the high load region of the procedure (c), the ECU 35 determines that the supply of external EGR should be executed in addition to the supply of internal EGR gas and the supercharging. In this case, the ECU 35 controls the control valve 25 to be opened.

In the operation region of the procedure (c), external EGR gas, which has a relatively low temperature, is drawn into the cylinder to retard the ignitability, which has been overly improved by the supply of internal EGR gas and the supercharging. Accordingly, combustion abnormality such as premature ignition and unstable combustion are avoided. In this manner, the supply of the external EGR gas in addition to the supply of the internal EGR gas and the super charging reliably prevents abnormality such as premature ignition. The operational range is thus expanded to a higher load region.

As described above, in this embodiment, the closing timing of the exhaust valve 9 in the exhaust stroke is advanced relative to the top dead center of the piston 4 (FIG. 5). Therefore, combusted gas is trapped in the combustion chamber b to secure tho internal EGR gas. The internal EGR gas, together with the supercharging by the supercharger 15, improves the ignitability. Further, the supercharger 15 is driven by the electric motor 14. The number of revolutions of the motor 14 is changed so that the supercharging pressure is changed. Therefore, the supercharging pressure is changed according to the load. This expands the operational range of the engine 1 to a higher load region.

Also, in this embodiment, the EGR passage 24 is constructed to recirculate exhaust gas from the exhaust manifold 22 and the exhaust pipe 23 to a section upstream of the supercharger 15. This permits a great amount external EGR gas to be recirculated to the intake side. In this embodiment, since the engine 1 is a gas engine that supplies gas fuel to the combustion chamber 5, exhaust gas contains a small amount of soluble organic fraction (SOF). Therefore, even if exhaust gas is recirculated to a section upstream of the supercharger 15, SOF does not collect on the members of the supercharger 15, or on the impeller of the centrifugal compressor to adversely affect the operation.

Further, the EGR control valve 25 is closed by the ECU 35 (the EGR valve controlling section 51) during a low load operation, and is closed during a high load operation. Therefore, even if the operational range of the HCCI internal combustion engine 1 is expanded to middle to high load regions, a great amount of external EGR gas is recirculated to the combustion chamber 5 during a high load operation by opening the EGR control valve 25. This decelerates the combustion rate in the combustion chamber 5. That is, abnormal combustion such as premature ignition is prevented so that the engine 1 operates smoothly.

Also, in this embodiment, the EGR cooler 26 is provided in the EGR passage 24. Therefore, external EGR gas is recirculated after being cooled by the EGR cooler 26. This permits the combustion rate in the combustion chamber 5 to be effectively retarded. Accordingly, the operational range of the engine 1 is further expanded to a higher load region.

In addition, the variable valve timing mechanism 32 is provided for the exhaust valve 9 in this embodiment. Thus, by changing the closing timing of the exhaust valve 9, the amount of internal EGR gas trapped in the combustion chamber 5 is changed, so that the ignitability of mixture is easily controlled.

It should be apparent to those skilled in the art that the present invention may be embodied in many other specific forms without departing from the spirit or scope of the invention. Particularly, it should be understood that the invention may be embodied in the following forms.

(1) In the embodiment of FIGS. 1 to 5, the centrifugal compressor driven by the electric motor 14 is used as the supercharger 15. However, the impeller shaft of the centrifugal compressor may be coupled to the crankshaft of the engine 1. In this case, a clutch may be used so that the supercharging pressure can be varied according to the load. Also, the supercharger 15 may be replaced by a turbocharger having an impeller shaft coupled to a turbine that is rotated by exhaust gas. For example, a variable-vane turbocharger may be used as the supercharger 15.

(2) In the embodiment of FIGS. 1 to 5, the valve timing of the intake and exhaust valves 7, 9 is controlled as illustrated in FIG. 5. That is, the closing timing of the exhaust valve 9 (EVC) is advanced relative to the top dead center of the intake stroke, and the opening timing of the intake valve 7 (IVO) is delayed relative to the top dead center of the intake stroke by the same degree. However, the degree of delay of the opening timing of the intake valve 7 may be decreased in relation to the degree of advancement of the closing timing of the exhaust valve 9.

Figure 6:
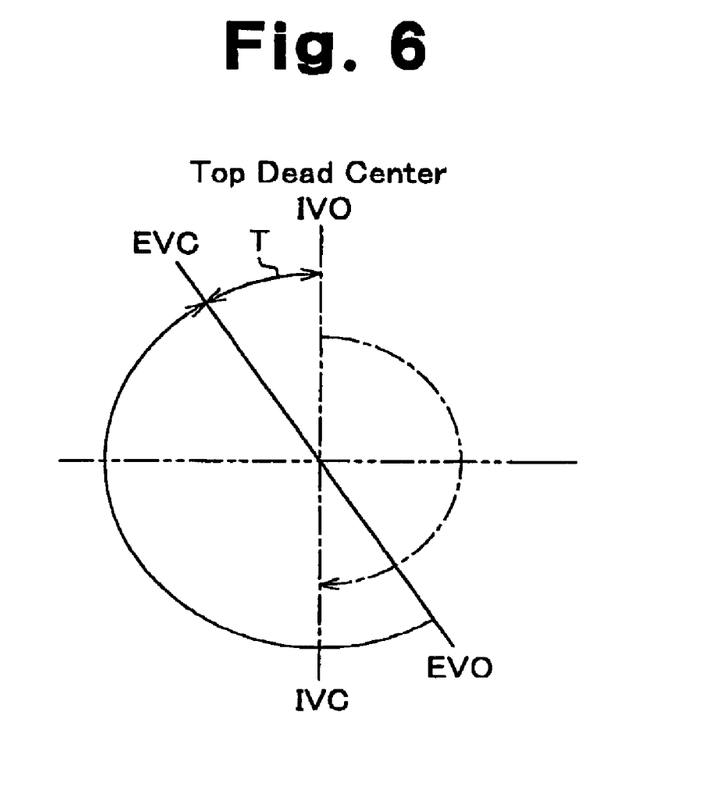
FIG. 6 is diagrammatic view showing opening and closing timing of intake and exhaust valves according to a modified embodiment.

As shown in FIG. 6, the degree of delay of the opening timing of the intake valve 7 may be also most zero relative to the degree of advancement of the closing timing of the exhaust valve 9, so that the intake valve 7 is opened at about the top dead center of the intake stroke.

In this case, the intake valve 7 is opened when the piston 4 reaches the top dead center, or when the trapped residual gas is compressed and the temperature and the pressure of the gas are high. Thus, when the intake valve 7 is opened, the high temperature residual gas bursts and flows back to the intake port 8 and is mixed with air-fuel mixture. This heats the air-fuel mixture. Thereafter, the piston 4 passes the top dead center and starts the intake stroke. Accordingly, the residual gas (internal EGR gas) reenters the combustion chamber 5 with the air-fuel mixture from the intake side. In this case, the intake air is heated by the internal EGR gas, and the ignitability is improved.

(3) In the embodiment of FIGS. 1 to 5, the external EGR gas is recirculated to a section that is upstream of the supercharger 15 through the EGR passage 24. However, in an engine having two or more cylinders, exhaust gas of a cylinder that is in the exhaust stroke can be recirculated to another cylinder that is in the intake stroke. In this case, high pressure exhaust gas of a cylinder in the exhaust stroke is used so that external EGR gas is supplied to a section downstream of the centrifugal compressor functioning as the supercharger 15, or to a section where the intake pressure is boosted. In this configuration, external EGR gas does not need to pass through the centrifugal compressor functioning as the supercharger 15. Therefore, this modification can be applied to a diesel engine, in which exhaust gas contains a great amount of SOF. In this case, SOF is prevented from collecting on the supercharger 15 (specifically, the impeller of the centrifugal compressor). The operation is not adversely affected by SOF.

(4) The present invention may be applied to an internal combustion engine that has an ignition plug in the combustion chamber and performs HCCI and spark ignition. For example, in the ignition control map shown in FIG. 4, a region for spark ignition may be provided, which corresponds to higher load and higher number of revolutions than the compression ignition regions. When it is determined that spark ignition is necessary based on the number of revolutions of the engine 1 and the demanded load, an ignition signal is sent to the spark plug so that spark ignition is performed. In this case, the ignition timing control according to this embodiment expands the region where the compression ignition can be performed, so that a high thermal efficiency and lowered NOx emission are achieved in a wide operational range.

(5) In the embodiment of FIGS. 1 to 5, the engine 1 uses town gas. (natural gas) as fuel. However, the engine arid the ignition timing control method according to this embodiment may be applied to a case where other gas such as propane gas is used as fuel. Also, in the illustrated embodiment, the range of HCCI is expanded by using all of the internal ECR, the variable supercharging pressure supercharger, and the external EGR. However, the external EGR is not necessarily performed. The present invention is feasible only with the internal EGR and the variable supercharging pressure supercharger. In this case, the operational range is narrower than the case with the external EGR. However, since the problem-caused by SOF does not need to be considered, fuel is not limited gas fuel, and liquid fuel such as gasoline may be used.

(6) In the illustrated embodiment, the present invention is applied to the engine 1 of the heat pump cycle. However, the present invention may be applied to engines of various purposes such as vehicle engines.

Therefore, the present examples and embodiments are to be considered as illustrative and not restrictive and the invention is not to be limited to the details given herein, but may be modified within the scope and equivalence of the appended claims.

The invention claimed is:

1. A homogeneous charge compression ignition internal combustion engine that performs EGR, the engine comprising:
   a piston;
   a combustion chamber;
   intake and exhaust passages that communicate with the combustion chamber;
   an intake valve that opens and closes the combustion chamber to the intake passage;
   an exhaust valve that opens and closes the combustion chamber to the exhaust passage, wherein the closing timing of the exhaust valve is advanced to a point prior to the point at which the piston reaches the top dead center in the exhaust stroke;
   a supercharger located in the intake passage, the supercharger being of a variable supercharging pressure type; and
   a supercharger controlling section that controls the supercharger to change supercharging pressure according to a demanded load of the engine, thereby controlling the ignition timing of premixture in the combustion chamber.

2. The engine according to claim 1, wherein the supercharger controlling section does not permit the supercharger to perform supercharging when the demanded load of the engine is relatively low.

3. The engine according to claim 1, wherein the supercharger is driven by an electric motor.

4. The engine according to claim 1, wherein the opening timing of the intake valve is delayed to a point after the point at which the piston switches from the exhaust stroke to the intake stroke.

5. The engine according to claim 1, wherein fuel supplied to the combustion chamber is gas fuel.

6. The engine according to claim 1, wherein the engine is used for driving a compressor in a gas heat pump that performs heat pump cycle for air conditioning.

7. The engine according to claim 1, further comprising a variable valve timing mechanism that changes the closing timing of the exhaust valve.

8. The engine according to claim 7, wherein the variable valve timing mechanism delays the closing timing of the exhaust valve as the demanded load of the engine increases.

9. The engine according to claim 1, further comprising an EGR passage that returns exhaust gas in the exhaust passage to a section in the intake passage that is upstream of the supercharger.

10. The engine according to claim 9, further comprising:
    an EGR valve located in the EGR passage;
    an EGR valve controlling section that controls the EGR valve, wherein, when the demanded load of the engine is relatively low, the EGR valve controlling section causes the EGR valve to close the EGR passage, and wherein, when the demanded load of the engine is relatively high, the EGR valve controlling section causes the EGR valve to open the EGR passage.

11. The engine according to claim 9, wherein an EGR cooler is located in the EGR passage.

12. A homogeneous charge compression ignition internal combustion engine that performs EGR, the engine comprising:
    a piston;
    a combustion chamber;
    intake and exhaust passages that communicate with the combustion chamber;
    an intake valve that opens and closes the combustion chamber to the intake passage;
    an exhaust valve that opens and closes the combustion chamber to the exhaust passage, wherein the closing timing of the exhaust valve is advanced to a point prior to the point at which the piston reaches the top dead center in the exhaust stroke; and
    a supercharger located in the intake passage, the supercharger being of a variable supercharging pressure type,
    wherein the engine is used for driving a compressor in a gas heat pump that performs heat pump cycle for air conditioning.

13. A method for controlling ignition timing of a homogeneous charge compression ignition internal combustion engine that includes a piston, a combustion chamber, and intake and exhaust passages that communicate with the combustion chamber, the method comprising:
    opening and closing the combustion chamber to the intake passage with an intake valve in the intake stroke of the piston;
    opening and closing the combustion chamber to the exhaust passage with an exhaust valve in the exhaust stroke of the piston, wherein the exhaust valve closes before the piston reaches the top dead center in the exhaust stroke; and
    changing supercharging pressure of a supercharger, which is of a variable supercharging pressure type and is located in the intake passage, according to a demanded load of the engine, thereby controlling the ignition timing of premixture in the combustion chamber.

14. The method according to claim 13, wherein the supercharger is not permitted to perform supercharging when the demanded load of the engine is relatively low.

15. The method according to claim 13, further comprising:
    returning exhaust gas in the exhaust passage to a section in the intake passage that is upstream of the supercharger through an EGR passage;
    closing the EGR passage when the demanded load of the engine is relatively low; and
    opening the EGR passage when the demanded load of the engine is relatively high.

16. The method according to claim 13, further comprising advancing the opening timing of the intake valve as the demanded load of the engine increases.

17. The method according to claim 13, further comprising changing the closing timing of the exhaust valve with a variable valve timing mechanism.

18. The method according to claim 17, wherein changing the closing timing of the exhaust valve includes delaying the closing timing of the exhaust valve as the demanded load of the engine increases.

* * * * *

UNITED STATES PATENT AND TRADEMARK OFFICE
CERTIFICATE OF CORRECTION

PATENT NO. : 7,066,158 B2
APPLICATION NO. : 10/946855
DATED : June 27, 2006
INVENTOR(S) : Hiroshi Kuzuyama It is certified that error appears in the above-identified patent and that said Letters Patent is hereby corrected as shown below:

On The Title Page

Column 2, Item [56] FOREIGN PATENT DOCUMENTS, line 1, please delete "JP 2003-64863" and insert therefor --JP 2000-64863--;

On The Title Page

Column 2, line 55, please delete "air conditioning and healing" and insert therefor --air conditioning and heating--;

Column 3, line 15, please delete "combustion chamber b" and insert therefor --combustion chamber 5--;

Column 3, line 42, please delete "ECR passage 24" and insert therefor --EGR passage 24--;

Column 4, line 6, please delete "section b1" and insert therefor --section 51--;

Column 4, line 66, please delete "ECR control valve 25" and insert therefor --EGR control valve 25--;

Column 5, line 19, please delete "internal ECR gas" and insert therefor --internal EGR gas--;

Column 6, line 27, please delete "is riot performed" and insert therefor --is not performed--;

Column 6, line 32, please delete "internal. ECR gas" and insert therefor --internal EGR gas--;

Column 6, line 42, please delete "Therefore, 3 sufficient" and insert therefor --Therefore, a sufficient--;

Column 6, line 44, please delete "internal ECR gas" and insert therefor --internal EGR gas--;

Column 6, line 51, please delete "intake valve i" and insert therefor --intake valve 7--; and

UNITED STATES PATENT AND TRADEMARK OFFICE
CERTIFICATE OF CORRECTION

PATENT NO. : 7,066,158 B2
APPLICATION NO. : 10/946855
DATED : June 27, 2006
INVENTOR(S) : Hiroshi Kuzuyama It is certified that error appears in the above-identified patent and that said Letters Patent is hereby corrected as shown below:

Column 7, line 9, please delete "chamber b to secure tho internal" and insert therefor --chamber 5 to secure the internal--.

Signed and Sealed this

Eleventh Day of September, 2007

JON W. DUDAS
*Director of the United States Patent and Trademark Office*